(12) United States Patent
Mottes et al.

(10) Patent No.: US 8,472,928 B2
(45) Date of Patent: Jun. 25, 2013

(54) SYSTEM AND METHODS FOR MULTI-TASKING IN A CLIENTLESS MOBILE PHONE

(71) Applicant: VascoDe Technologies Ltd., Tel Aviv (IL)

(72) Inventors: Dorron Mottes, Tel Aviv (IL); Gil Zaidman, Kfar Vitkin (IL); Reuven Marko, Netanya (IL)

(73) Assignee: VascoDe Technologies Ltd., Tel Aviv (IL)

( * ) Notice: Subject to any disclaimer, the term of this patent is extended or adjusted under 35 U.S.C. 154(b) by 0 days.

(21) Appl. No.: 13/709,108

(22) Filed: Dec. 10, 2012

(65) Prior Publication Data

US 2013/0095814 A1    Apr. 18, 2013

Related U.S. Application Data

(63) Continuation of application No. PCT/US2011/049386, filed on Aug. 26, 2011.

(60) Provisional application No. 61/377,958, filed on Aug. 29, 2010.

(51) Int. Cl.
*H04M 3/42* (2006.01)

(52) U.S. Cl.
USPC ........................................ 455/414.1

(58) Field of Classification Search
USPC .... 455/414.1–414.4, 466, 563, 401; 370/466, 370/401, 338, 353, 354, 355, 356; 704/270.1, 704/275, 235; 709/227, 228, 229; 379/88.17, 379/88.18
See application file for complete search history.

(56) References Cited

U.S. PATENT DOCUMENTS

| | | |
|---|---|---|
| 5,201,049 A | 4/1993 | Shorter |
| 5,421,012 A | 5/1995 | Khoyi et al. |
| 5,925,114 A | 7/1999 | Hoang |
| 7,158,779 B2 | 1/2007 | Hon et al. |
| 7,355,589 B2 | 4/2008 | Eo et al. |
| 7,363,027 B2 | 4/2008 | Hon et al. |
| 7,577,427 B2 | 8/2009 | Bicker et al. |
| 7,650,164 B2 | 1/2010 | Nguyen et al. |
| 7,738,424 B2 | 6/2010 | Ng et al. |
| 2008/0177821 A1 | 7/2008 | Tsao |

FOREIGN PATENT DOCUMENTS

WO    2009/139437    11/2009

OTHER PUBLICATIONS

PCT International Search Report and Written Opinion of the International Searching Authority for corresponding International Application No. PCT/US2011/049386; date of completion Mar. 30, 2012.

*Primary Examiner* — Melody Mehrpour
(74) *Attorney, Agent, or Firm* — Myers Wolin, LLC

(57) ABSTRACT

A system for multi-tasking access to applications by a clientless mobile phone. The system includes at least a clientless mobile interaction (CMI) application server communicatively connected to a network; at least one application server communicatively connected to a network, the at least one application server having at least a first application executable on the clientless mobile phone and a second application executable on the clientless mobile phone; and a presentation layer gateway communicatively connected to the network, wherein the CMI application server enables the clientless mobile phone communicatively connected to the presentation layer gateway by at least a presentation layer protocol to access the first application and the second application executed on the CMI application server while presenting a menu on the clientless mobile phone for seamless switching between the first application and the second application executed on the CMI application server.

20 Claims, 3 Drawing Sheets

SYSTEM AND METHODS FOR MULTI-TASKING IN A CLIENTLESS MOBILE PHONE

CROSS-REFERENCE TO RELATED APPLICATIONS

This application is a continuation of International Application No. PCT/US11/49386 filed Aug. 26, 2011, which claims the benefit of US provisional application No. 61/377,958 filed on Aug. 29, 2010, the contents of which are incorporated herein by reference.

TECHNICAL FIELD

The invention generally relates to mobile phone, and more particularly to the execution of mobile applications on clientless mobile phones.

BACKGROUND

It has become commonplace in modern smart phones to support the execution of applications (also known as "mobile applications", "native applications" or "apps"). The applications are downloaded from different sources.

The operation of such applications is typically performed in a client-server mode where the application is executed as a client on the smart phone. This requires the smart phone to be able to execute an operating system to support such applications. In some cases, a smart phone, such as some of the iPhone® models from Apple Computers®, can execute only a single application at a time. In other cases, no application can be executed on the phone due to the fact that the phone is of an older type and does not include an operating system that supports the download of applications to operate in a client mode.

It would be therefore be advantageous to provide a solution that overcomes the deficiencies of the prior art and that enables multi-tasking of applications by a mobile phone.

SUMMARY

Certain embodiments of the invention include system for multi-tasking access to applications by a clientless mobile phone. The system includes at least a clientless mobile interaction (CMI) application server communicatively connected to a network; at least one application server communicatively connected to a network, the at least one application server having at least a first application executable on the clientless mobile phone and a second application executable on the clientless mobile phone; and a presentation layer gateway communicatively connected to the network, wherein the CMI application server enables the clientless mobile phone communicatively connected to the presentation layer gateway by at least a presentation layer protocol to access the first application and the second application executed on the CMI application server while presenting a menu on the clientless mobile phone for seamless switching between the first application and the second application executed on the CMI application server.

Certain embodiments of the invention also include a clientless mobile interaction (CMI) application server for multi-tasking access to applications by a clientless mobile phone. The system comprises an interface to communicate with at least an application server over a network, the at least one application server having at least a first application executable on a mobile phone and a second application executable on a mobile phone; an interface to communicate with a presentation layer gateway over the network; a processor for executing instructions stored in a memory accessible to the processor; the memory containing a plurality of instructions to enable a clientless mobile phone communicatively connected to the presentation layer gateway by at least a presentation layer protocol to access the first application and the second application executed on the CMI application server while presenting on a menu on the clientless mobile phone for seamless switching between the first application and the second application executed on the CMI application server.

Certain embodiments of the invention also include a method of multi-tasking access to applications for a clientless mobile phone performed by a clientless mobile interaction (CMI) application server. The method comprises communicating with at least an application server to receive at least a first mobile application and a second mobile application; executing at least the first mobile application and the second mobile application responsive of a request from a clientless mobile phone communicatively connected to the CMI application server via a presentation layer gateway; generating a display of a menu and causing the display of the menu on a clientless mobile phone using a presentation layer protocol, the menu's items include at least a reference to the first mobile application and the second mobile application; and switching between the first mobile application and the second mobile application responsive of selection of one of the menu's items displayed on the clientless mobile phone.

Certain embodiments of the invention also include a system for off-loading execution of applications from a mobile phone. The system comprises at least a clientless mobile interaction (CMI) application server communicatively connected to a network; at least an application server communicatively connected to the network, the at least an application server having at least a first application executable on a mobile phone and a second application executable on the mobile phone; and a presentation layer gateway communicatively connected to the network, wherein the CMI application server enables the mobile phone communicatively connected to the presentation layer gateway by at least a presentation layer protocol to access at least the first application executed on the CMI application server while presenting a menu on the mobile phone for seamless switching between the first application executed on the CMI application server and the second application executed on the mobile phone, responsive to an indication that the mobile phone requests to off-load execution of the at least first application by moving the execution of the at least the first application to the CMI application server.

BRIEF DESCRIPTION OF THE DRAWINGS

The subject matter that is regarded as the invention is particularly pointed out and distinctly claimed in the claims at the conclusion of the specification. The foregoing and other objects, features, and advantages of the invention will be apparent from the following detailed description taken in conjunction with the accompanying drawings.

DETAILED DESCRIPTION

Figure 1:
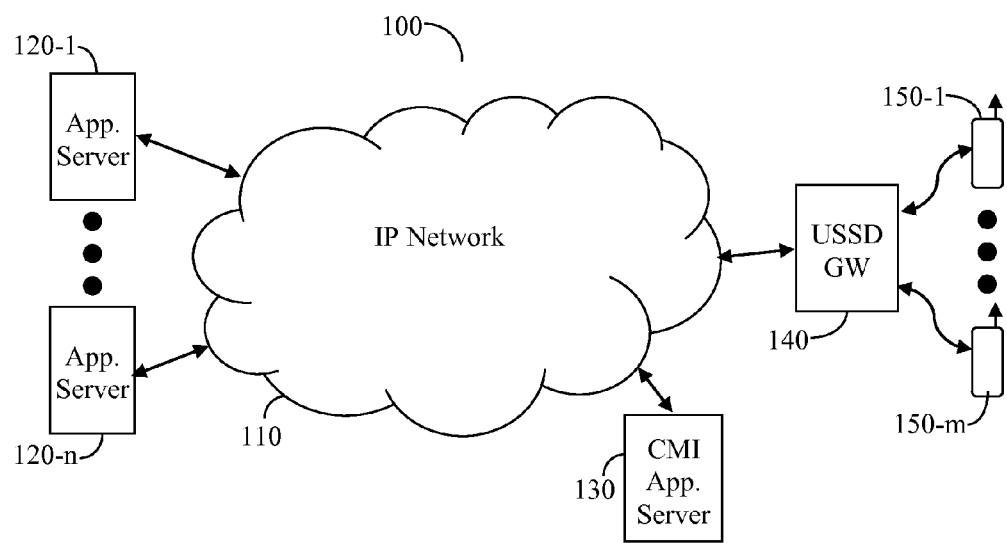
FIG. 1 is a system for providing a clientless application access for mobile phones in accordance with an embodiment of the invention.

It is important to note that the embodiments disclosed by the invention are only examples of the many advantageous uses of the innovative teachings herein. In general, statements made in the specification of the present application do not necessarily limit any of the various claimed inventions. Moreover, some statements may apply to some inventive features but not to others. In general, unless otherwise indicated, singular elements may be in plural and vice versa with no loss of generality. In the drawings, like numerals refer to like parts through several views.

For many mobile phones and operating systems running on these phones it is impossible for the user to access two different applications at the same time. Certain exemplary embodiments of the invention allow a user access from the mobile phone to multiple applications regardless of the type of phone or the operating system used. This multi-tasking operation is done on a clientless mobile phone over the network. The user can switch between the available applications using presentation layer protocols, such as the unstructured supplementary service data (USSD) protocol.

The disclosed invention addresses the problem of multi-tasking applications provided for mobile phones where the mobile phones are incapable of multi-tasking or, the number of tasks performed in parallel is limited to a number that is less than what is desired by the user. For example, a user of a mobile phone may wish to run in parallel many applications. Such applications include, without limitations, social network applications, such as, but not limited to, mobile Twitter®, mobile Facebook®, mobile e-mail, and mobile Skype®, and other kinds of applications such as a mobile private branch exchange (PBX), address book, camera operation whether video or still, and more. A mobile phone, incapable of multi-tasking, would, for example but not by way of limitation, cease reception of e-mail when a call is received, or otherwise, not accept such a call. By contrast, according to certain embodiments of the invention, the applications are emulated on another server, and thus can be held active for the user until such time that the application can be handled again.

FIG. 1 depicts an exemplary and non-limiting system 100 for providing clientless application access for mobile phones in accordance with an embodiment of the invention. A network 110 communicatively connects between the various elements of the system 100. The network 110 can comprise a local area network (LAN), a metro area network (MAN), a wide area network (WAN), be it wired or wireless, and any combinations thereof. To the network there are connected one or more application servers 120, for example, application servers 120-1 through 120-n (where 'n' is an integer greater than 1), each providing access to one or more applications, such as mobile applications (apps), native applications, or any applications that traditionally can be executed on a smart phone. Typically, according to prior art solutions, a smart phone requires an upload, installation, and execution of the application on the smart phone.

The system 100 is used to provide a multi-tasking access to one or more mobile phones 150, depicted as mobile phone 150-1 through 150-m ('m' is an integer number greater than 1), each of which typically has a graphics display but being incapable of running a plurality of applications in a multi-tasking fashion. It should be further noted that while some smart phones (e.g., one or more of mobile phones 150-1, . . . ,150-n) may be capable of running applications in multi-tasking, it is possible that the number of tasks is limited and when reaching close to capacity may hinder the operation of the phones.

To overcome the shortcomings of running a limited number of applications in a multi-tasking execution mode, a clientless mobile (CMI) application server 130 is communicatively connected to the network 110. The CMI application server 130 is designed to communicate with one or more application servers 120-1 through 120-n and is capable of running a plurality of such applications and instantiations thereof on the server 130. In one embodiment of the invention, one or more CMI application servers may be added to system 100 to enable support of an ever increasing number of mobile phones 150 needing the multi-tasking services.

It should be appreciated that the teachings disclosed herein are applicable also when having a single application that is executed on a CMI application server 130. However, it should be further appreciated that in the case of operational limitation of a client based mobile phone, for example, when having a limited capability to run a plurality of applications in a client-based mode, the CMI application server 130 may be used to reduce the load from the mobile phone and its operating system. This may be of a particular benefit when the battery is low and it is advantageous to maintain the ability to multi-task. In this case, the mobile phone may access the applications without executing them in practice, thereby drawing less energy off of the battery.

The execution of the application, while seemingly performed on a mobile phone, e.g., mobile phone 150-$i$ (where $i=1, \ldots, m$), is in fact emulated on the CMI application server 130 as far as the applications servers 120-1 through 120-$n$ are concerned. Furthermore, from the perspective of a mobile phone 150, for example, a mobile phone 150-$i$, the multi-tasking is handled outside of the phone if the phone is incapable of multi-tasking different applications, or moved to the server when the number of tasks is larger than the phone can handle. As a result, a mobile phone 150-$i$ that would otherwise be incapable of multi-tasking, or having a limitation on the number of tasks it runs in parallel, may appear as being capable of practically endless depths of multi-tasking, i.e., appear to be executing many applications in parallel without losing connections to any one of them, even though, as a matter of fact, such applications are not executed on the mobile phone itself. In one embodiment of the invention, the decision of when to take over certain applications for execution on the CMI application server 130 is performed by the server 130 in a seamless manner.

According to an embodiment of the invention, when an application is executed for a mobile phone 150-$i$ on the CMI application server 130, the communication with the mobile phone 150-$i$ to send and receive instructions and responses is performed using a presentation layer protocol, such as an unstructured supplementary services data (USSD) protocol. Communication with the mobile devices 150-1 through 150-$m$ is performed using a presentation layer protocol gateway, for example, through a USSD gateway 140. The USSD protocol is supported by practically all mobile phones, and hence the discussion herein is with respect of the USSD protocol, but as would be understood by those who are of ordinary skill in the art, other presentation layer protocols may be equally used.

By means of creating menus on a mobile phone 150-$i$, the user can further interact with and switch from one application to another without losing the connectivity of the application that continues to execute on the server 130.

Figure 2:
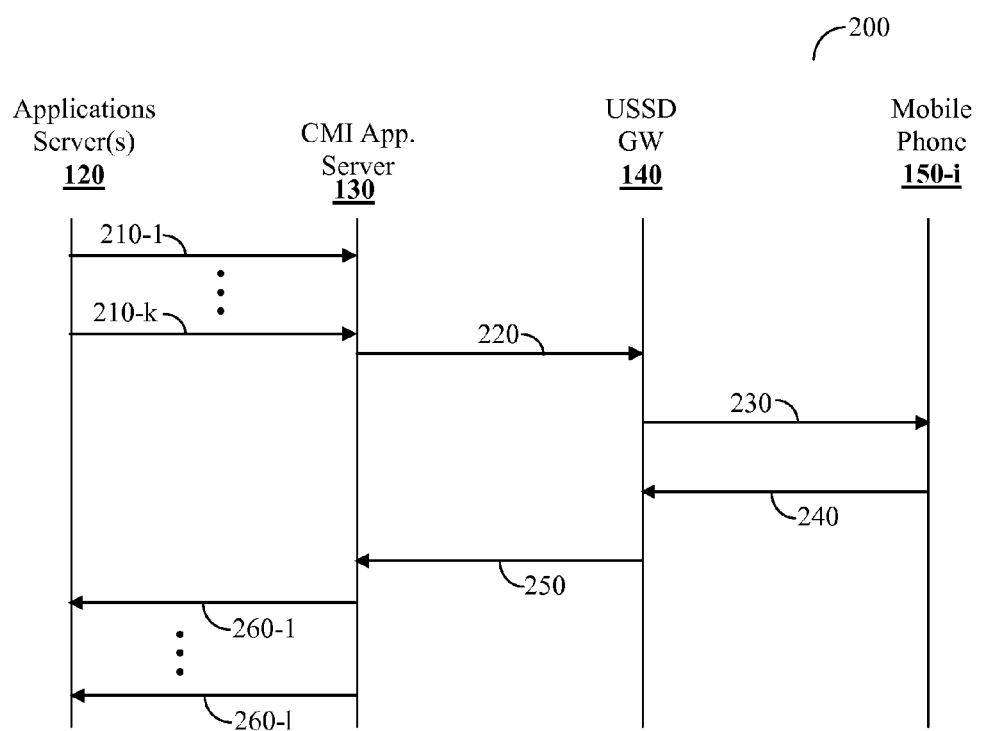
FIG. 2 is a communication diagram of the operation of the system in accordance with an embodiment of the invention.

FIG. 2 shows an exemplary and non-limiting communication diagram 200 of the operation for providing a clientless application access for mobile phones in accordance with an embodiment of the invention. The diagram 200 provides one example of an application communication from which those of ordinary skill in the art can easily create other communication schemes based on this description to enable other operations of one or more application servers 120, each running one or more applications versus a mobile phone 150-*i* and vice versa.

An application on an application server 120 may send a message, for example, message 210-1 to the CMI application server 130. The CMI application server 130 interprets the message 210-1 and sends a message 220 to the USSD gateway 140 respective of the received message 210-1. The USSD gateway 140, using the USSD protocol, communicates with the target mobile phone 150-*i* by sending at least a message 230 and as may be applicable receiving at least a message 240, all using the USSD protocol. The response message 240 sent to the USSD gateway (GW) 140 is then transferred to the CMI application (Appl.) server 130 by means of a message 250. When applicable a message 260-1, . . . , 260-*l*, that corresponds to the same application on the same application server 120, is sent from the CMI application server 130 to the appropriate application server 120.

It should be understood that the CMI application server 130 operates as an aggregator of applications, each sending its own message 260-1 through 260-*l*, for a mobile phone 150-*i*, where the mobile phone 150-*i*, through the use of the USSD protocol, and in accordance to an embodiment of the invention, the user of the mobile phone 150-*i* may enable different applications all running on or through the CMI application server 130. User menus, generated by means of the USSD protocol, on the mobile phone 150-*i*, represent a single application or a combination of two or more applications that are in fact executing on or through the CMI application server 130 on behalf of the mobile phone 150-*i*.

The CMI application server 130 renders inputs or functions for all available applications into a single menu thus creating for the user the appearance, usability and control of multiple applications at the same time despite the lack of multi-tasking capabilities, or sufficient resources for that. Similarly, a response message 240 sent from the mobile phone 150-*i* is received by the USSD gateway 140 and sent by means of a message 250 to the CMI applications server 130. The CMI application server 130 directs the received message to the appropriate application and application server 120 by means of one of a plurality of messages 260-1 through 260-*l* corresponding to the appropriate application.

It should be further understood that the CMI application server 130 may aggregate several messages 210-*i*, 210-*j*, etc., where i and j are integers between 1 and k, from the same or different applications, from the same or different application servers 120, into a single message 220. Similarly, the CMI application server 130 may split a message 250 to message 260-*i*, 260-*j*, etc., where i and j are integers between 1 and l, targeted at one or more applications executing on one or more application servers 120-1 through 120-*n*.

In accordance with an embodiment the invention, menus displayed on a mobile phone 150-*i* can be modified to fit the state of the user within each of the applications. This can be performed, in real-time, using the USSD protocol as the means of communication. Hence, the same menu could, for example and not by way of limitation, have options like send e-mail, read Twitter, delete message, and more, all based on the previous action or actions taken with respect of each application the user keeps "alive" on the CMI application server 130.

Figure 3:
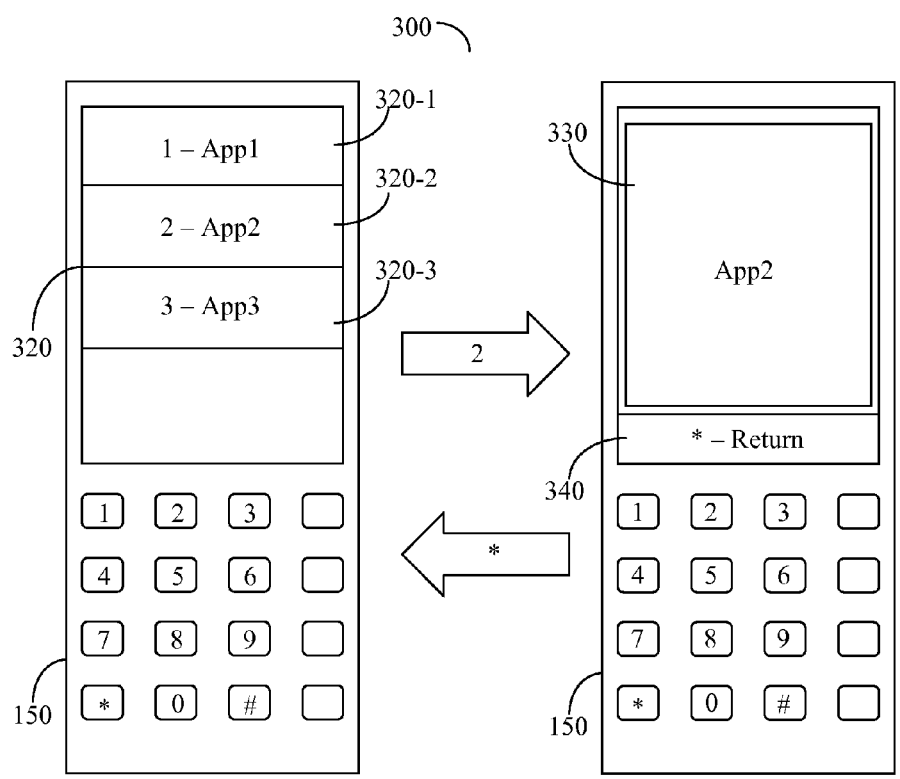
FIG. 3 is a schematic diagram of a mobile phone using a USSD interface to switch between applications executed on remote servers in accordance with an embodiment of the invention.

FIG. 3 depicts an exemplary and non-limiting schematic diagram 300 of a mobile phone 150 using a USSD interface to switch between applications executing on remote servers according to an embodiment of the invention. Initially, using a USSD protocol, a menu 320 is displayed on the phone which includes a message for selection of one of three applications App1 320-1, App2 320-2 and App3 320-3, each of which is associated in this case with a numeral, 1 through 3 respectively. Upon the user selecting one of the three, for example, selecting 2, App2 is displayed, over display 330 of mobile phone 150, together with a return indication, for example '*' on the phone's keypad. App2 is actually executed over an application server 120 that communicates as described with respect of FIG. 2 above, to display content from App2 in the display area 330. When a user wants to switch to another application the user can hit '*' and return to the menu 320. From the mobile phone 150 perspective the applications App1, App2 and App3 are always available and are multi-tasked even though the mobile phone 150 may not provide any multi-tasking capabilities or has limited capabilities to perform same.

It should be noted that one or more of the applications may be converted to support the operation according to the techniques disclosed herein, and such converted applications may reside on the CMI application server 130. The server 130 enables such converted applications to operate under the USSD protocol requirements and capabilities.

In one embodiment of the invention, a menu that lists the applications currently being executed on the CMI application server 130 is displayed on the user's mobile phone 150-*i*. Such a list may include items such as Gmail®, Twitter, and Facebook. From the main menu, the mobile phone 150-*i* can be routed to menus that relate to a specific application. For example, but not by way of limitation, the user is tweeting and there are three open states in Gmail, call control and presence.

According to another embodiment of the invention, the user of the mobile phone 150-*i* may, at any time, switch to another application by entering, for example '000' or '*' which brings up that menu. From there the user can select to return to the current state of another selected application. For example, if a call control is selected, then the menu will reflect the current call control state that the CMI application server 130 has maintained on the network. The menu selections are conveyed using messages transferred from the mobile phone 150 to the CMI application server 130 through the USSD gateway 140, e.g., using messages 240 and 250. The new menus generated in response to the selections are conveyed using messages transferred from the server 130 through the mobile phone 150 through the USSD gateway 140, e.g., messages 220 and 230. Those of ordinary skill in the art will appreciate that other menu combinations and application switching are possible according to the principles of the invention and without departing from the spirit of the invention. All of these are specifically included as part of the invention.

In yet another embodiment of the invention the CMI application server 130 is used with respect of a smart mobile phone capable of running in a multi-tasking mode, i.e., capable of executing a plurality of applications. However, there are cases where it is advantageous to off load execution of an application from the mobile phone to the CMI application server 130. For example, when the battery of the mobile phone is drained, then, in accordance with certain embodiments of the invention, it is possible to move one or more of the applications currently executed on the mobile phone to the CMI application server thereby reducing the power consumption of the mobile phone. In addition, or alternatively, if there is an attempt to overload the processor of the mobile phone with too many applications executed in parallel, the CMI application server 130 may be used to offload one or more applications currently executed on the mobile phone to the CMI application server 130. This way reasonable performance for the applications executing on the mobile phone is maintained without loss of operability of a large number of applications for that mobile phone.

In an embodiment of the invention, the CMI application server 130 includes an interface to the network to communicate with a plurality of application servers, USSD gateway, and a plurality of mobile phones. The CMI application server 130 may include a processor for execution of computer executable code preferably implemented as an application program tangibly embodied on a program storage unit or non-transitory computer readable medium consisting of parts, or of certain devices and/or a combination of devices. A non-transitory computer readable medium is any computer readable medium except for a transitory propagating signal. The computer executable code may be uploaded to, and executed by, a machine comprising any suitable architecture. Preferably, the machine is implemented on a computer platform having hardware such as one or more central processing units ("CPUs"), a random access memory ("RAM"), and input/output interfaces. The computer platform may also include an operating system and microinstruction code. The various processes and functions described herein may be either part of the microinstruction code or part of the application program, or any combination thereof, which may be executed by a CPU, whether or not such computer or processor is explicitly shown. In addition, various other peripheral units may be connected to the computer platform such as an additional data storage unit and a printing unit.

The functions of the various elements shown in the figures may be provided through the use of dedicated hardware as well as hardware capable of executing appropriate software, specifically various integrations of an application server 120, a CMI application server 130 and a USSD gateway, in any combination. When provided by a processor, the functions may be provided by a single dedicated processor, by a single shared processor, or by a plurality of individual processors, some of which may be shared. Explicit use of the term "processor" or "controller" should not be construed to refer exclusively to hardware capable of executing software, and may implicitly include, without limitation, digital signal processor hardware, ROM, RAM, and non-volatile storage. Other hardware, conventional and/or custom, may also be included. Similarly, any switches shown in the figures are conceptual only.

All examples and conditional language recited herein are intended for pedagogical purposes to aid the reader in understanding the embodiments of the invention and the concepts contributed by the inventor to furthering the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It will be appreciated that although various aspects of the invention have been described with respect to specific embodiments, alternatives and modifications will be apparent from the present disclosure, which are within the spirit and scope of the present invention as set forth in the following claims.

What is claimed is:

1. A system for multi-tasking access to applications by a clientless mobile phone comprising:

at least a clientless mobile interaction (CMI) application server communicatively connected to a network;

at least one application server communicatively connected to a network, the at least one application server having at least a first application executable on the CMI application server and a second application executable on the CMI application server; and a presentation layer gateway communicatively connected to the network, wherein the CMI application server enables the clientless mobile phone communicatively connected to the presentation layer gateway by at least a presentation layer protocol to access the first application executing on the CMI application server and the second application executing on the CMI application server while presenting a menu on the clientless mobile phone for seamless switching between the first application executing on the CMI application server and the second application executing on the CMI application server.

2. The system of claim 1, wherein at least one of the first application and second application is a social network application.

3. The system of claim 1, wherein at least one of the first application and the second application is one of: an e-mail application, an address book application, a private branch exchange (PBX), a call control application, a presence application.

4. The system of claim 1, wherein said presentation layer protocol is an unstructured supplementary services data (USSD) protocol.

5. The system of claim 4, wherein the USSD protocol causes the display of the menu on the clientless mobile phone, wherein the menu presents at least the first application and the second application.

6. The system of claim 5, wherein responsive of a menu selection of one of the first application and the second application the CMI application server returns to the selected application at a current point of execution of the selected application.

7. The system of claim 1, wherein an item in a menu respective of the first application appears responsive of the second application.

8. The system of claim 1, wherein the clientless mobile phone is a mobile phone that does not support execution of applications in a client-server mode.

9. A clientless mobile interaction (CMI) application server for multi-tasking access to applications by a clientless mobile phone, comprising:

an interface to communicate with at least an application server over a network, the at least one application server having at least a first application executable on the CMI application server and a second application executable on the CMI application server;

an interface to communicate with a presentation layer gateway over the network;

a processor for executing instructions stored in a memory accessible to the processor;

the memory containing a plurality of instructions to enable the clientless mobile phone communicatively connected to the presentation layer gateway by at least a presentation layer protocol to access the first application executing on the CMI application and the second application executing on the CMI application server while presenting a menu on the clientless mobile phone for seamless switching between the first application executing on the CMI application server and the second application executing on the CMI application server.

10. The CMI application server of claim 9, wherein at least one of the first application and second application is a social network application.

11. The CMI application server of claim 9, wherein at least one of the first application and second application is one of: an e-mail application, an address book application, a private branch exchange (PBX), a call control application, a presence application.

12. The CMI application server of claim 9, wherein said presentation layer protocol is an unstructured supplementary services data (USSD) protocol.

13. The CMI application server of claim 12, wherein the USSD protocol causes the display of the menu on the clientless mobile phone, wherein the menu presents at least the first application and the second application.

14. The CMI application server of claim 13, wherein responsive of a menu selection of one of the first application and the second application the CMI application server returns to the selected application at a current point of execution of the selected application.

15. The CMI application server of claim 9, wherein an item in a menu respective of the first application appears responsive of the second application.

16. A method of multi-tasking access to applications for a clientless mobile phone, the method is performed by a clientless mobile interaction (CMI) application server to which the clientless mobile phone is communicatively connected to, comprising:

communicating with at least an application server to receive at least a first mobile application and a second mobile application;

executing at least the first mobile application and the second mobile application responsive of a request from a clientless mobile phone on the CMI application server via a presentation layer gateway;

generating a display of a menu and causing the display of the menu on a clientless mobile phone using a presentation layer protocol, the menu's items include at least a reference to the first mobile application and the second mobile application; and switching between the first mobile application and the second mobile application responsive of selection of one of the menu's items displayed on the clientless mobile phone.

17. The method of claim 16, wherein at least one of the first application and second application is a social network application.

18. The method of claim 16, wherein at least one of the first application and second application is one of: an e-mail application, an address book application, a private branch exchange (PBX), a call control application, a presence application.

19. The method of claim 16, wherein said presentation layer protocol is an unstructured supplementary services data (USSD) protocol.

20. The method of claim 16, further comprising:

displaying a menu item in the menu respective of the first application appears responsive of a second application.

* * * * *